(12) United States Patent
Kim et al.

(10) Patent No.: US 10,605,176 B2
(45) Date of Patent: Mar. 31, 2020

(54) CONTROL METHOD FOR ENGINE VARIABLE VALVE TIMING OF HYBRID ELECTRIC VEHICLE

(71) Applicants: Hyundai Motor Company, Seoul (KR); Kia Motors Corporation, Seoul (KR)

(72) Inventors: Se Geun Kim, Yongin-si (KR); Tae Ho Ahn, Incheon (KR); Dong Shin, Hwaseong-si (KR); Dong Jun Shin, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 103 days.

(21) Appl. No.: 15/695,909

(22) Filed: Sep. 5, 2017

(65) Prior Publication Data

US 2018/0171882 A1 Jun. 21, 2018

(30) Foreign Application Priority Data

Dec. 21, 2016 (KR) .......................... 10-2016-0175487

(51) Int. Cl.
  *F02D 13/02* (2006.01)
  *F02D 41/00* (2006.01)
  (Continued)

(52) U.S. Cl.
  CPC ......... *F02D 13/0219* (2013.01); *B60W 20/10* (2013.01); *F02D 13/0261* (2013.01); *F02D 41/0002* (2013.01); *F02D 41/0032* (2013.01); *F02D 41/2422* (2013.01); *F02D 2009/024* (2013.01); *F02D 2041/001* (2013.01);
  (Continued)

(58) Field of Classification Search
  CPC .............................. F02M 25/08; F02D 41/003
  See application file for complete search history.

(56) References Cited

U.S. PATENT DOCUMENTS

| | | | | |
|---|---|---|---|---|
| 5,485,596 A | * | 1/1996 | Igarashi | F02M 25/0809 701/101 |
| 2004/0007194 A1 | * | 1/2004 | Iizuka | F01L 1/34 123/90.15 |

(Continued)

*Primary Examiner* — Patrick Hamo
*Assistant Examiner* — Wesley G Harris
(74) *Attorney, Agent, or Firm* — Morgan, Lewis & Bockius LLP

(57) ABSTRACT

A method for controlling an engine variable valve timing of a hybrid electric vehicle, may include providing a cam position setting table of a fuel efficiency prioritized intake/exhaust cam control mode, and a cam position setting table of a normal intake/exhaust cam control mode, the cam position setting table of the fuel efficiency prioritized intake/exhaust cam control mode being differentiated from the cam position setting table of the normal intake/exhaust cam control mode; selecting one of the fuel efficiency prioritized intake/exhaust cam control mode and the normal intake/exhaust cam control mode by a canister loading amount and whether or not diagnosis of an intake cam and diagnosis of an exhaust cam are completed; and determining position control values of the intake and exhaust cams by using the cam position setting table and then controlling positions of the intake cam and the exhaust cam by the determined position control values.

8 Claims, 3 Drawing Sheets

(51) Int. Cl.
*F02D 41/24* (2006.01)
*B60W 20/10* (2016.01)
*F02D 9/02* (2006.01)

(52) U.S. Cl.
CPC ........... *F02D 2250/41* (2013.01); *Y02T 10/18* (2013.01); *Y02T 10/42* (2013.01)

(56) References Cited

U.S. PATENT DOCUMENTS

| | | | |
|---|---|---|---|
| 2005/0193721 A1* | 9/2005 | Surnilla | F02D 41/0087 60/285 |
| 2013/0233287 A1* | 9/2013 | Leone | F02M 25/08 123/520 |
| 2014/0060160 A1* | 3/2014 | Pursifull | F02M 25/0809 73/40 |
| 2016/0108773 A1* | 4/2016 | Rollinger | F01L 1/047 123/90.17 |
| 2016/0273494 A1* | 9/2016 | Hotta | F02M 25/0836 |
| 2017/0204796 A1* | 7/2017 | Dudar | F02D 41/0035 |
| 2018/0171914 A1* | 6/2018 | Ulrey | F01N 3/10 |

* cited by examiner

| Engine RPM(RPM) |
|---|
| Engine torque(N) | Fuel efficiency prioritized intake/exhaust cam control region (Fix intake cam to retarded position) |
| | Intake/exhaust cam position control region (Advance control) |
| | Full load control region |

FIG. 3

| Engine RPM(RPM) |
|---|
| Engine torque(N) | Intake/exhaust cam position control region (Advance control) |
| | Full load control region |

FIG. 4

CONTROL METHOD FOR ENGINE VARIABLE VALVE TIMING OF HYBRID ELECTRIC VEHICLE

CROSS-REFERENCE(S) TO RELATED APPLICATIONS

The present application claims priority to Korean Patent Application No. 10-2016-0175487 filed on Dec. 21, 2016, the entire contents of which are incorporated herein for all purposes by this reference.

BACKGROUND OF THE INVENTION

Field of the Invention

The present invention relates to a control method for engine variable valve timing of a hybrid electric vehicle, more particularly, to a control method for engine variable valve timing of a hybrid electric vehicle which enables control of an intake/exhaust cam for improvement in the fuel efficiency of the vehicle while securing a canister purge amount and addressing a problem related to On-board diagnostics (OBD) diagnosis.

Description of Related Art

An internal combustion engine generates power by drawing fuel and air into a combustion chamber and burning the same.

When the air is drawn in, the intake valves are operated by driving a camshaft, and air is drawn into the combustion chamber through an intake port while the intake valves are opened.

Further, exhaust valves are operated by driving the camshaft, and gas is discharged from the combustion chamber to the outside through an exhaust port while the exhaust valves are open.

However, the optimum intake valve and exhaust valve opening and closing timing and opening duration depend on the operation conditions such as RPM and load of the engine.

That is, appropriate valve opening and closing timing depends on the RPM of the engine.

Accordingly, a technique of delaying or advancing the valve timing has been introduced, and combustion efficiency may be improved by adjusting the valve timing according to the operation conditions of the engine.

Accordingly, a variable valve timing (VVT) device for changing the phase at which an intake valve or an exhaust valve is opened or closed is used as a device for realizing an appropriate valve operation according to the operation conditions of the engine.

The above makes it possible to optimally control the valve opening and closing timing by changing the phase of the camshaft and the phase of the valves with respect to the crankshaft by rotating the camshaft for optimum valve timing from a low speed to a high speed, thereby improving fuel efficiency, reducing exhaust gas emissions, boosting low-speed torque, and improving engine output power.

That is, in an engine to which the VVT device is applied, the valve overlap of the intake and exhaust valves may be increased to reduce pumping loss, and therefore fuel efficiency can be improved according to the decrease in pumping loss.

Further, since it is possible to optimize the valve overlap according to the operation conditions of the engine, the exhaust gas may be reduced by the effect of re-burning of the unburned gas by the internal exhaust gas recirculation (EGR). In addition, since volume efficiency can be enhanced by optimization of the timing of the intake valve, the low-speed torque may be increased and the engine output power may be enhanced.

In the case of a VVT control for assisting the engine power performance in an engine to which the VVT device is applied, for example, the valve overlap is increased by advancing the intake and exhaust cams in the full load and high load regions of the engine to improve the intake performance of the engine.

Further, in the low load region the intake and exhaust cams are retarded to reduce valve overlap and to secure engine idling and fuel efficiency control performance.

In the middle load condition, the VVT control is performed considering management of the fuel efficiency and the trade-off region of the power performance.

When the intake and exhaust cam is advanced, the valve overlap is increased. When the valve overlap increases, the engine negative pressure increases and the engine output power increases.

In contrast, when the intake/exhaust cam is controlled to be at a retarded position (not advanced), the valve overlap decreases. When the valve overlap decreases, the engine negative pressure decreases and the engine output decreases.

The VVT technique for controlling the position of the intake and exhaust camshaft according to the operation conditions of the engine is also applied to a hybrid electric vehicle using an engine and an electric motor as the vehicle driving sources.

That is, after the driver required torque is determined from the vehicle drive information and state information, and the engine torque and the motor torque satisfying the driver required torque are determined likewise, when a camshaft position control value is determined from the determined engine torque (or intake air amount) and the current RPM value of the engine, the position of the intake/exhaust camshaft is controlled by operating the actuator of the VVT device according to the determined position control value.

Herein, the position control value of the intake/exhaust cam is determined by setting data (table or map) in the engine control unit (ECU) in which the advanced position of the intake/exhaust cam is predetermined for the engine torque and the engine speed.

However, the control value set in the setting data, or the position setting value of the intake/exhaust camshaft is restricted for OBD and control of the intake negative pressure of the engine.

Herein, control of the intake negative pressure of the engine is necessary for canister purge control for evaporative gas regulation.

When the intake/exhaust cam of the hybrid electric vehicle is controlled to be at the maximum retarded position (i.e., the position where the cam is not advanced) to maximize the fuel efficiency in the normal operation range except for a certain region (e.g. a full load region) (the output insufficient for the driver required torque is compensated with the motor assist), fuel efficiency may be improved, and generation of the negative pressure of the engine is reduced. Therefore, during driving in the federal test procedure (FTP) certified mode, the evaporation gas regulation or the VVT diagnosis condition may not be satisfied or Onboard Diagnostics (OBD) diagnosis is impossible due to the insufficient amount of the canister purge according to decrease in generation of the engine negative pressure.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control method for engine variable timing of a hybrid electric vehicle which enables control of the intake/exhaust cam for improvement in the fuel efficiency of the vehicle while securing the canister purge amount and addressing a problem related to OBD diagnosis.

Various aspects of the present invention are directed to providing a method for controlling an engine variable valve timing of a hybrid electric vehicle, including: providing a cam position setting table of a fuel efficiency prioritized intake/exhaust cam control mode for improving fuel efficiency, and a cam position setting table of a normal intake/exhaust cam control mode for enhancing engine negative pressure performance, the cam position setting table of the fuel efficiency prioritized intake/exhaust cam control mode being differentiated from the cam position setting table of the normal intake/exhaust cam control mode; selecting one of the fuel efficiency prioritized intake/exhaust cam control mode and the normal intake/exhaust cam control mode according to a canister loading amount, and whether or not diagnosis of an intake cam and diagnosis of an exhaust cam are completed; and determining position control values of the intake cam and the exhaust cam using the cam position setting table of the selected control mode, and then controlling positions of the intake cam and the exhaust cam according to the determined position control values.

Other aspects and exemplary embodiments of the invention are discussed infra.

It is understood that the term "vehicle" or "vehicular" or other similar term as used herein is inclusive not only of motor vehicles in general including passenger automobiles including sports utility vehicles (SUV), buses, trucks, various commercial vehicles, and watercraft including a variety of boats and ships, aircraft, but also of hybrid vehicles, electric vehicles, plug-in hybrid electric vehicles, hydrogen-powered vehicles and other alternative fuel vehicles (e.g. fuels derived from resources other than petroleum). As referred to as herein, a hybrid vehicle means a vehicle that has two or more sources of power including a gasoline-powered vehicle and an electric-powered vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a view schematically illustrating a cam position setting table of a fuel efficiency prioritized intake/exhaust cam control mode; and FIG. 4 is a view schematically illustrating a cam position setting table of a normal intake/exhaust cam control mode.

Figure 1:
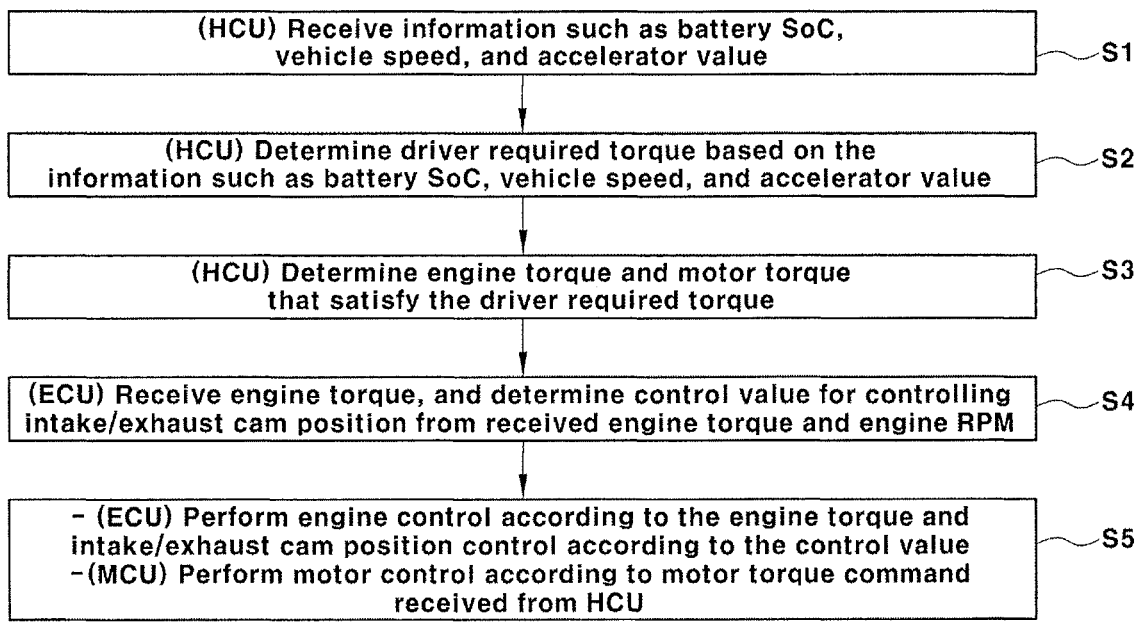
FIG. 1 is a flowchart illustrating a variable valve timing control process according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes, will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

In addition, in the description of the present invention, a detailed Description of Related art and the like will be omitted when it is determined to make the subject of the present invention unclear.

Throughout the specification, when an element is referred to as "including" an element, the element may include the other elements rather than excluding the other elements, unless specifically stated otherwise.

Various embodiments of the present invention relates to a control method for variable valve timing of an engine configured for improving fuel efficiency of a hybrid electric vehicle.

Various aspects of the present invention are directed to providing a control method for engine variable valve timing of a hybrid electric vehicle which enables control of an intake/exhaust cam for improvement of the fuel efficiency of the vehicle while securing a canister purge amount and addressing a problem related to OBD diagnosis.

First, a control method for variable valve timing of a hybrid electric vehicle according to the related art will be described to facilitate understanding of the present invention.

Generally, control of the variable valve timing (VVT) of the engine, that is, the position control of the intake/exhaust cam is performed by coordinated control which is performed by a plurality of controllers in a vehicle.

As shown in FIG. 1, a Hybrid Control Unit (HCU), which is the highest level controller, receives vehicle drive information and state information including the battery State of Charge (SoC) received from the Battery Management System (BMS), the current vehicle speed detected by a vehicle speed detection device and a current accelerator value (accelerator position sensor (APS) value) detected by an APS (S1), and determines the total required torque required in the vehicle based on the received vehicle drive information and the state information (S2).

Further, the HCU determines an engine torque (engine required torque) and a motor torque (motor required torque) that satisfy the total required torque (S3).

At the present time, an engine torque according to the optimum operating point is determined, and in combination with the engine torque a motor torque that satisfies the required torque is determined.

Once the engine torque is determined, the Engine Control Unit (ECU) receives the engine torque from the HCU through CAN communication and controls the throttle of the engine and the position of the intake/exhaust cam in accordance with the engine torque received by the ECU.

At the present time, the ECU determines a control value (target camshaft position value) that controls the intake/exhaust cam position (camshaft position) to be a value corresponding to the determined engine torque (or intake air amount) and the current engine RPM in the embedded setting data (table or map) (S4), and controls the actuator of the VVT device according to the determined control value to control the position of the intake/exhaust cam (S5).

Further, the HCU generates and outputs a command value corresponding to the motor torque and the Motor Control Unit (MCU) controls the operation of the motor in accordance with the motor torque command output from the HCU (S5).

The position of the intake/exhaust cam may mean the positions of the intake camshaft and the exhaust camshaft provided with cams for opening and closing the intake valve and the exhaust valve respectively, and controlling the position of the intake/exhaust cam may include controlling the position of the intake camshaft and the position of the exhaust camshaft.

"intake/exhaust" refers to both intake and exhaust. Therefore, the "intake/exhaust cam" refers to both the intake cam and the exhaust cam, and the "intake/exhaust camshaft" refers to both the intake camshaft and the exhaust camshaft.

In the conventional intake/exhaust cam control mode, the control value predetermined in the setting data, that is, the set value of the intake/exhaust camshaft position, is limited in consideration of OBD diagnosis and control of the engine intake negative pressure.

Here, control of the intake negative pressure of the engine is necessary for the canister purge control which is configured for coping with evaporative gas regulations.

Therefore, in consideration of the above, the present invention adds a fuel efficiency prioritized intake/exhaust cam control mode as one of the engine variable valve timing (VVT) control modes, and when the fuel efficiency prioritized intake/exhaust cam control mode is performed, the engine output power is lowered and control is performed to further compensate for the reduced engine output power with motor assist accordingly.

The fuel efficiency prioritized intake/exhaust cam control mode is configured to set the intake/exhaust cam control position (camshaft position control value) for improving the fuel efficiency by avoiding the restriction raised in setting the intake/exhaust cam control position.

In addition, the fuel efficiency prioritized intake/exhaust cam control mode is a mode which extends the operation region in which the position of the intake cam (intake camshaft position) is fixed to a retarded position, for maximizing improvement of fuel efficiency. In the present mode, all intake cam positions are fixed to retarded positions in the operation region except for the high load region (high torque region) having torques not lower than a set torque and the high speed region (high RPM region) having speeds not lower than a set speed (RPM).

However, in the fuel efficiency prioritized intake/exhaust cam control mode, it is not an optimal control condition to control the position of the exhaust cam (exhaust camshaft position) to a retarded position in terms of fuel efficiency and exhaust gas emissions, and thus the position of the exhaust cam is controlled to a favorable position in terms of the fuel efficiency and exhaust gas emissions.

At the present time, a separate exhaust cam position setting table or map different from that of the normal intake/exhaust cam control mode, which will be described later, is predetermined, and the position control value of the exhaust cam is estimated using the above exhaust cam position setting table or map. Then, the position of the exhaust cam is controlled, setting the estimated position control value as a target value.

The present fuel efficiency prioritized intake/exhaust cam control mode may be particularly considered as a mode in which fuel efficiency is prioritized even when the negative pressure performance and the output performance of the engine are slightly degraded since the operation region in which the intake cam is fixed to a retarded position without advancing the intake cam is significantly extended, compared with the conventional intake/exhaust cam control mode.

Further, variable valve timing control (VVT) logic is configured to control the position of the intake/exhaust cam differently according to the conditions.

In other words, the fuel efficiency prioritized intake/exhaust cam control mode is set to be performed only when a predetermined mode entry condition is satisfied and the ECU determines whether to enter and perform the fuel efficiency prioritized intake/exhaust cam control mode.

When the set entry condition is not satisfied, an intake/exhaust cam control mode is performed to control the position of the intake/exhaust cam with a control value determined according to the engine torque (or the intake air amount) and the engine RPM.

The present mode is a control mode different from the fuel efficiency prioritized intake/exhaust cam control mode, and hereinafter will be referred to as "normal intake/exhaust cam control mode".

With the addition of the fuel efficiency prioritized intake/exhaust cam control mode, the engine variable valve timing control mode includes the fuel efficiency prioritized intake/exhaust cam mode in which the intake cam is not advanced in the extended operation region for improving fuel efficiency and the normal intake/exhaust cam control mode which controls the position of the intake/exhaust cam with a control value according to the engine torque (intake air amount) and the engine RPM.

In other words, various aspects of the present invention are directed to providing two variable valve timing control modes that are selected according to the conditions: the fuel efficiency prioritized intake/exhaust cam control mode; and the normal intake/exhaust cam control mode, and variable valve timing control is performed in a selected one of the two modes.

Figure 2:
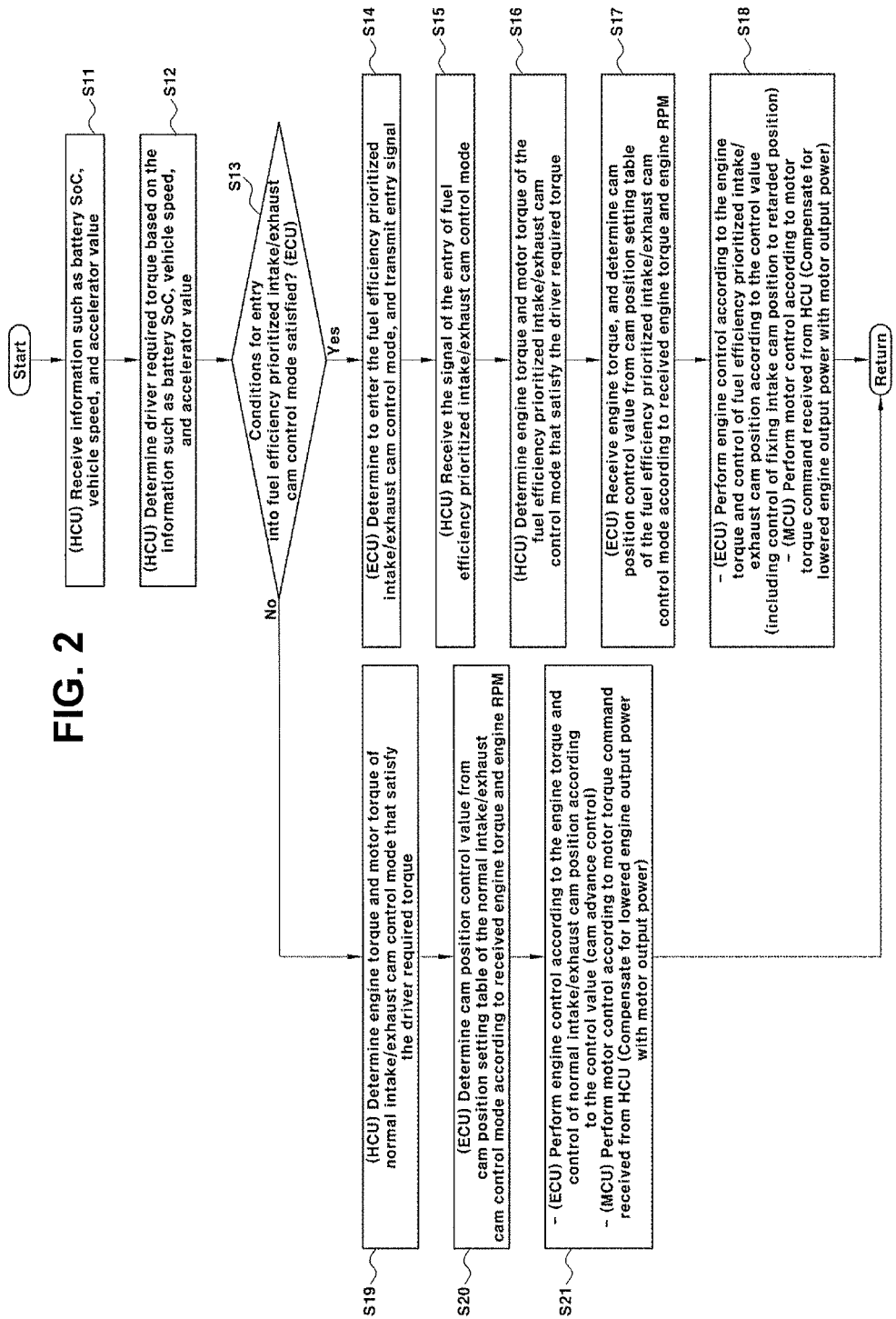
FIG. 2 is a flowchart illustrating a variable valve timing control procedure.

FIG. 2 is a flowchart illustrating a variable valve timing control procedure which is implemented under coordinated control of the HCU and the ECU. In the following description, the operations performed by the two controllers of the HCU and the ECU are discussed separately, but the variable valve timing control procedure may be implemented by an integrated controller that integrally performs the control functions of the HCU and the ECU.

In addition, since engine output power insufficient for performing the fuel efficiency prioritized intake/exhaust cam control mode is additionally compensated with motor assist, control of a motor control unit (MCU) for controlling motor output power according to a motor torque command generated and output by the HCU for output compensation by the motor assist is needed, and a BMS is also involved in the control procedure since the battery SoC information is required for determining the required torque in the hybrid electric vehicle.

As shown in FIG. 2, the HCU first receives vehicle drive information and state information including the battery SoC, the current vehicle speed, and the accelerator value (S11), and determines a total required torque (a driver required torque) required by the vehicle (S12) from the received vehicle drive information and state information In addition, the ECU determines whether the canister loading amount is less than a predetermined reference value and whether the diagnosis of the intake cam and the diagnosis of the exhaust cam are both completed (S13).

The reference value is a value determined from the preceding test and evaluation process and input to the ECU.

When the purge flow rate is estimated using the values of variables of the operating state including the control duty value of a purge control solenoid valve (PCSV) and the surge tank pressure, the combustion gas may be determined using an air-fuel ratio signal output in response to the oxygen detector in addition to the purge flow rate.

In addition, since various methods for determining or obtaining the canister loading amount information are known, a method for determining or obtaining the canister loading amount is not particularly limited in an exemplary embodiment of the present invention.

Since the canister loading amount is variable information that is already used for the in-vehicle control and the method for determining or obtaining the canister loading amount including determining the canister loading amount from the purge flow rate and the air-fuel ratio information corresponds to a known technology, a detailed description thereof will be omitted.

When both of the above conditions are satisfied, that is, when it is determined that the value of the canister loading amount is less than the reference value and the diagnosis of the intake cam and the diagnosis of the exhaust cam are all completed, the ECU selects the fuel efficiency prioritized intake/exhaust cam control mode as the variable valve timing control mode.

In other words, the above conditions are conditions for entry into the fuel efficiency prioritized intake/exhaust cam control mode, and the fuel efficiency prioritized intake/exhaust cam control mode is entered only when the above conditions are satisfied.

The canister loading amount means a trapping amount of a gaseous fuel including hydrocarbons currently captured in the canister. When the canister loading amount is greater than or equal to a reference value, a large amount of the gaseous fuel components exceeding the reference value is adsorbed to the activated carbon in the canister, and therefore there is a high possibility that the purge operation will be performed using the negative pressure of the engine by opening the purge control valve, or the PCSV.

As is well known, in an engine equipped with a canister, the fuel vapor generated in the fuel tank is collected in the canister, and the purge control solenoid valve (PCSV) is opened during engine operation wherein the fuel collected in the canister is purged to the engine intake side and then burned in the engine.

In the fuel efficiency prioritized intake/exhaust cam control mode, since the position of the intake cam is fixed to a retarded position (i.e., the intake cam is not advanced) in many operation regions except for the high speed and high load regions, the degree of opening of the throttle valve is increased to intake the same amount of air.

At the present time, as the force of drawing air into the combustion chamber, namely the negative pressure, is lowered, the air charge efficiency of the combustion chamber is lowered (the air amount required for combustion is not normally supplied). Consequently, the engine output power decreases and the canister purge performance is degraded.

In the fuel efficiency prioritized intake/exhaust cam control mode, the reduced amount of engine output power is compensated with motor assist, but such compensation may result in degradation in canister purging performance.

Sufficient engine negative pressure is required for the purge operation. Accordingly, when the value of the loading amount of the canister is greater than or equal to the reference value, there is a certain possibility of the purge operation, and therefore entry into the fuel efficiency prioritized intake/exhaust cam control mode is prohibited. Accordingly, entry into the fuel efficiency prioritized intake/exhaust cam control mode is allowed only when the loading amount is less than the reference value.

In the normal intake/exhaust cam control mode, which is performed when the canister loading amount is greater than or equal to the reference value, since the position of the camshaft is controlled with a control value according to the operation condition of the engine using the VVT device, the throttle valve may be normally opened, the engine negative pressure may be increased, and the engine output power and the canister purge performance may be improved, as compared to the fuel efficiency prioritized intake/exhaust cam control mode.

The intake cam diagnosis process and the exhaust cam diagnosis process are normal diagnosis processes of diagnosing the responsiveness of the VVT device by checking whether the position of the actual camshaft is shifted to a position corresponding to the control value when the position of the camshaft is shifted with a predetermined control value by controlling the operation of the actuator.

Since the intake cam diagnosis process and the exhaust cam diagnosis process are known processes which are already performed in a manner of diagnosing the responsiveness to the VVT device in accordance with predetermined diagnosis logic in an engine to which a VVT device is applied, a detailed description of the processes and the corresponding method will be omitted.

The intake cam diagnosis and the exhaust cam diagnosis include an operation of controlling the actuator of the VVT device to advance the intake/exhaust cam position, and therefore it is difficult to perform the intake cam diagnosis and the exhaust cam diagnosis during the execution of the fuel efficiency prioritized intake/exhaust cam control mode in which the cam position is fixed to a retarded position in many operation regions.

Therefore, intake cam diagnosis and exhaust cam diagnosis should be performed during the normal intake/exhaust cam control mode before the fuel efficiency prioritized intake/exhaust cam control mode is entered. Particularly, since the fuel efficiency prioritized intake/exhaust cam control mode should be entered only when the intake cam diagnosis and exhaust cam diagnosis are completed, the conditions for entry into the fuel efficiency prioritized intake/exhaust cam control mode are set to include a condition that the intake cam diagnosis and the exhaust cam diagnosis should be completed.

That is, it is checked whether the intake cam diagnosis and the exhaust cam diagnosis have already been completed wherein the fuel efficiency prioritized intake/exhaust cam control mode may be entered only when the cam diagnosis is not required.

When the condition set by the ECU is satisfied and entry into the fuel efficiency prioritized intake/exhaust cam control mode is determined as described above, the ECU transmits a signal notifying of the entry of fuel efficiency prioritized intake/exhaust cam control mode (S14) to the HCU that has determined the total required torque (driver required torque), and correspondingly the HCU receives the signal from the ECU (S15) and determines the engine torque (engine required torque) and the motor torque (motor required torque) based on the total required torque (S16).

As the fuel efficiency prioritized intake/exhaust cam control mode is entered, the optimum operation point is determined from the engine operation point map for the fuel efficiency prioritized intake/exhaust cam control mode and system efficiency, and the engine torque and the motor torque corresponding to the optimum operation point are determined.

On the other hand, in the normal intake/exhaust cam control mode, which does not satisfy the conditions set in step S13, the optimum operation point is determined from the engine operation point map for the normal intake/exhaust cam control mode and system efficiency, and the engine torque and the motor torque corresponding to the optimum operation point are determined (S19).

The engine operation point map for the fuel efficiency prioritized intake/exhaust cam control mode has an engine torque value set to a relatively small value under the same operation condition as compared to the engine operation point map used in the normal intake/exhaust cam control mode.

Therefore, the engine torque value determined using the engine operation point map for the fuel efficiency prioritized intake/exhaust cam control mode is determined to be a smaller value than in the normal intake/exhaust cam control mode under the same operation conditions.

On the other hand, since the total required torque (driver required torque) should be satisfied by the engine torque and the motor torque, the motor torque is determined to be a larger value than in the normal intake/exhaust cam control mode under the same operation conditions.

In the present manner, in the fuel efficiency prioritized intake/exhaust cam control mode, the reduced amount of the engine output power according to reduction in the engine torque determined by the HCU is compensated with the motor assist.

That is, by increasing the motor torque in proportion to the decreased amount of the engine torque to meet the required torque, the HCU increases the motor output power. As a result, by compensating for the reduced engine output power using the motor output power, a torque required by the driver may be output.

As described above, the operation point map for determining the engine torque is distinguished between the fuel efficiency prioritized intake/exhaust cam control mode and the normal intake/exhaust cam control mode, and thus the engine torque and the motor torque are determined differently depending on the selected mode.

In addition, as will be described later, the in-ECU setting data having a predetermined intake/exhaust cam position control value, namely, the intake/exhaust cam position setting table or map having a cam position control value set according to the engine torque (or the intake air amount) and the engine RPM, is also distinguished between the two modes.

The ignition timing determined according to the engine RPM, intake air amount, cam position, etc. also varies between the two modes since the cam position of the engine is determined differently depending on the mode even under the same operation conditions.

Here, the in-ECU setting data, that is, an ignition timing setting table or map in which the ignition timing is predetermined according to the engine RPM, intake air amount, cam position, etc., may also be divided into the two modes.

When the HCU receives the mode entry signal, or the signal indicating a selected mode, the HCU determines the engine torque and the motor torque corresponding to the selected mode (S13, S14-S16, and S19). Subsequently, when the HCU transmits the determined engine torque and motor torque to the ECU and the MCU as command values, the ECU controls the engine drive and the engine output according to the engine torque command, and the MCU drives the motor and controls the motor output power according to the motor torque command (S18, S21).

In addition, the ECU determines the position control value (target position value) of the intake/exhaust cams from the intake/exhaust cam position setting table (or map) of the corresponding mode based on the engine torque received from the HCU and the current engine RPM detected by the engine RPM detection unit (S17, S20), and then operates the actuator of the VVT device according to the control value to control the position of the intake/exhaust cam (S18, S21).

Here, in the fuel efficiency prioritized intake/exhaust cam control mode, the position control value of the intake/exhaust cam is determined from the fuel efficiency prioritized intake/exhaust cam position setting table (see FIG. 3) (S17). In the normal intake/exhaust cam control mode, on the other hand, the position control value of the intake/exhaust cam is determined from the normal intake/exhaust cam position setting table (see FIG. 4) (S20).

FIG. 3 is a view schematically illustrating a cam position setting table of the fuel efficiency prioritized intake/exhaust cam control mode, and FIG. 4 is a view schematically illustrating a cam position setting table in a normal intake/exhaust cam control mode.

As shown in the figures, the cam position setting table of each mode allows the position of the intake/exhaust cam to be determined from the engine torque determined by the HCU and the current engine RPM detected by the engine RPM detection device.

In the cam position setting table of the fuel efficiency prioritized intake/exhaust cam control mode shown in FIG. 3, the set position of the intake cam is fixed to a retarded position in the remaining operation region (region below a set torque and a set speed) excluding the high load region (high torque region) above a set torque and the high speed region (high RPM region) above a set RPM.

At the present time, unlike the intake cam, the position of the exhaust cam is not fixed to a retarded position in the above-described operation region, but may be set to a position different from the position set in the normal intake/exhaust cam control mode even when the same engine torque and the same engine RPM are given.

In the fuel efficiency prioritized intake/exhaust cam control mode, the position of the intake/exhaust cam may be controlled according to the engine torque and the engine RPM in the high load region and high speed region except for the above-described operation region (the operation region in which the intake cam is fixed to a retarded position). In the present case, the position of the intake/exhaust cam may be set to an advanced position.

Therefore, in the fuel efficiency prioritized intake/exhaust cam control mode, when the engine torque and the engine speed correspond to a region except for the high load region and high speed region, the intake cam position is fixed to the retarded position without being advanced.

On the other hand, the intake/exhaust cam advance control enabling increase an of the engine output power may be performed and the actuator of the VVT may be operated with a control value determined from the table according to the engine torque and the engine RPM value to advance the position of the intake/exhaust cam only when the engine torque and the engine speed correspond to the high load region and the high speed region.

In the cam position setting table of the normal intake/exhaust cam control mode shown in FIG. 4, the control value for controlling the position of the intake/exhaust cam (including advance control) is predetermined to a value according to the engine torque and the engine RPM.

Therefore, when the normal intake/exhaust cam control mode is selected and performed, the operation of the actuator of the VVT device may be controlled using the position control value determined according to the engine torque and the engine RPM from the table. Thereby, and the advance control for advancing the position of the intake/exhaust cams to a position corresponding to the control value may be performed.

In the present way, in an exemplary embodiment of the present invention, intake/exhaust cams control may be performed in any one mode selected between the fuel efficiency prioritized intake/exhaust cam control mode for improving the fuel efficiency and the normal intake/exhaust cam control mode for enhancement of the engine negative pressure performance and canister purge performance and OBD diagnosis of the intake/exhaust cams according to predetermined conditions. Therefore, the fuel efficiency of the vehicle may be improved, the canister purge amount may be secured, and an issue in OBD diagnosis may be handled.

As is apparent from the above description, with a control method for engine variable valve timing of a hybrid electric vehicle according to an exemplary embodiment of the present invention, control of an intake/exhaust cam may be performed in any one mode selected between a fuel efficiency prioritized intake/exhaust cam control mode for improving fuel efficiency and a normal intake/exhaust cam control mode facilitating enhancement of engine negative pressure performance and OBD diagnosis of the intake/exhaust cam according to a predetermined condition. Therefore, a canister purge amount and purge performance may be secured, and a problem related to OBD diagnosis of the cam may be addressed. In addition, the fuel efficiency of the vehicle may be improved.

Particularly, the control method may not only improve the fuel efficiency of the vehicle, but also have an advantage of coping with evaporative gas regulations and OBD diagnosis regulations.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as alternatives and modifications thereof. It is intended that the scope of the invention be defined by the Claims appended hereto and their equivalents.

What is claimed is:

1. A method for controlling an engine variable valve timing of a hybrid electric vehicle, the method comprising:
   providing a cam position setting table of a fuel efficiency prioritized intake/exhaust cam control mode to improve fuel efficiency, and a cam position setting table of a normal intake/exhaust cam control mode for enhancing engine negative pressure performance, the cam position setting table of the fuel efficiency prioritized intake/exhaust cam control mode being different from the cam position setting table of the normal intake/exhaust cam control mode;
   selecting one of the fuel efficiency prioritized intake/exhaust cam control mode and the normal intake/exhaust cam control mode according to an amount of a fuel vapor trapped in a canister into which the fuel vapor is collected and whether On-board diagnostics (OBD) diagnosis of an intake cam and OBD diagnosis of an exhaust cam are completed; and
   determining position control value of the intake cam and position control value of the exhaust cam by use of the cam position setting table of the selected one of the fuel efficiency prioritized intake/exhaust cam control mode and the normal intake/exhaust cam control mode and then controlling positions of the intake cam and the exhaust cam according to the determined position control values of the intake cam and the exhaust cam.

2. The method of claim 1, further including:
   providing an operation point map of the fuel efficiency prioritized intake/exhaust cam control mode and an operation point map of the normal intake/exhaust cam control mode, the operation point map of the fuel efficiency prioritized intake/exhaust cam control mode being different from the operation point map of the normal intake/exhaust cam control mode;
   determining, when a total required torque required in a vehicle is determined from driving information and state information about the vehicle, an engine torque and a motor torque satisfying the total required torque by the operation point map of the selected control mode; and
   determining the position control value of the intake cam and the position control value of the exhaust cam corresponding to the determined engine torque and a current engine speed by the cam position setting table of the selected one of the fuel efficiency prioritized intake/exhaust cam control mode and the normal intake/exhaust cam control mode.

3. The method of claim 2, wherein the operation point map of the fuel efficiency prioritized intake/exhaust cam control mode is set to an engine torque less than an engine torque of the operation point map of the normal intake/exhaust cam control mode under same operation conditions.

4. The method of claim 3, further including:
   controlling, when the engine torque and the motor torque satisfying the total required torque are determined in the fuel efficiency prioritized intake/exhaust cam control mode, operation of a motor to output the determined motor torque wherein a reduced amount of an output power of an engine compared to an output power in the normal intake/exhaust earn control mode is compensated with an output power of the motor while the total required torque is satisfied.

5. The method of claim 1, wherein the selecting includes: selecting the fuel efficiency prioritized intake/exhaust cam control mode when the amount of the fuel vapor trapped in the canister is less than a predetermined reference value and both the OBD diagnosis of the intake cam and the OBD diagnosis of the exhaust cam are completed.

6. The method of claim 1, wherein the cam position setting table of the fuel efficiency prioritized intake/exhaust cam control mode is configured wherein the determined, position control value of the intake cam is set to a retarded position in an operation region where an engine torque is less than a set torque and an engine speed is less than a set speed.

7. The method of claim 1, wherein the cam position setting table of the fuel efficiency prioritized intake/exhaust cam control mode is configured wherein the determined position control values of the intake cam and the exhaust cam are set to a position value corresponding to an engine torque and an engine speed in a high load region where the engine torque is greater than or equal to a set torque and a high speed region where the engine speed is higher than or equal to a set speed to enable advance control of the intake and exhaust cams.

8. The method of claim 1, wherein the cam position setting table of the fuel efficiency prioritized intake/exhaust cam control mode is configured wherein the determined position control values of the intake cam and the exhaust cam are set to a position value corresponding to an engine torque and an engine speed to enable advance control of the intake and exhaust cams.

* * * * *